United States Patent [19]

Takahashi et al.

[11] Patent Number: 5,809,002
[45] Date of Patent: Sep. 15, 1998

[54] DISK CLAMPING UNIT WITH A PLURALITY OF PARTICLES IN A SYNTHETIC RESIN COATING FORMED ON EITHER THE CLAMPER OR THE DISK TABLE

[75] Inventors: Akira Takahashi; Fuyuki Shirai; Jiro Morinaga; Yasushi Konno, all of Kawagoe, Japan

[73] Assignee: Pioneer Electronic Corporation, Tokyo-to, Japan

[21] Appl. No.: 624,929

[22] Filed: Mar. 29, 1996

[30] Foreign Application Priority Data

Mar. 30, 1995 [JP] Japan ................................. 7-097940

[51] Int. Cl.⁶ ............................................. G11B 17/028
[52] U.S. Cl. ............................................. 369/270; 369/264
[58] Field of Search ................................. 369/270, 263, 369/264; 428/139, 64.2, 327

[56] References Cited

U.S. PATENT DOCUMENTS

| 1,917,633 | 7/1933 | Burt | 369/263 |
| 2,184,482 | 12/1939 | Austin et al. | 428/139 |
| 4,054,291 | 10/1977 | Maeda | 369/263 |
| 4,721,751 | 1/1988 | Schappert et al. | 524/773 |
| 4,841,518 | 6/1989 | Nozu et al. | 369/270 |
| 4,913,410 | 4/1990 | Marshall | 267/153 |

FOREIGN PATENT DOCUMENTS 55-129905  10/1980  Japan ........................ 369/263

Primary Examiner—Robert S. Tupper
Assistant Examiner—David D. Davis
Attorney, Agent, or Firm—Sughrue, Mion, Zinn, Macpeak & Seas, PLLC

[57] ABSTRACT

A clamp unit for a disk comprises a disk table on which a disk is mounted and a clamper disposed in association with the disk table for clamping the disk under pressure therebetween. A film is formed on a surface of either one of the disk table and the clamper and formed of a mixture a synthetic resin and a plurality of fine particles disposed in the synthetic resin, both having viscous and elastic property, and some of the particles are exposed outside an outer surface of the film so as to provide an irregular surface having protruded portions.

8 Claims, 2 Drawing Sheets

DISK CLAMPING UNIT WITH A PLURALITY OF PARTICLES IN A SYNTHETIC RESIN COATING FORMED ON EITHER THE CLAMPER OR THE DISK TABLE

BACKGROUND OF THE INVENTION

1. Field of the Invention

The present invention relates to a clamp unit for disks such as optical disks, photo-magnetic disks or magnetic disk for clamping and rotating the same.

2. Description of the Related Art

Such a disk clamp unit generally comprises a disk table on which a disk, such as compact disk, is mounted to be rotatable and a clamper for clamping the disk under pressure in operative association with the disk table.

On the disk table is mounted a disk having a surface on which information is recorded and which has a center hole. The disk table is formed with a base having a projection to be fitted into the center hole of the disk to position the same. The disk table is rotated by means of, for example, an electric motor. A film or coating is applied to a surface of the disk table or the clamper against which the disk contacts, and the film or coating is generally made of a soft synthetic resin having a viscous and elastic property.

The clamper is formed of a metallic material or synthetic resin, or a mixture thereof and acts to push the disk against the disk table. The clamper is opened or closed by a clamper holder.

When the disk is operated and played, slipping motion between the disk and the disk table is prevented by the viscous and elastic property of the film and, in addition, a mechanical vibration applied on the disk can be also reduced thereby.

In a conventional structure of the disk clamp unit, however, in a case where the disk is played for a long time or a case where the disk is mounted or left on the disk table for a long time under the disk clamped condition, the film is stuck to the disk by the self-gravity of the disk or pressing force of the clamper and, in an adverse case, the disk cannot be peeled off from the disk table.

Particularly, under a high temperature condition, the film is softened as the temperature increases and the viscous property of the film increases, and under a high moisture condition, the moisture or water invades into a gap formed at a contact portion between the film and the disk, increasing a contacting area, which results in increasing of the viscosity of the film, thus providing problems. For these reasons, when the disk is taken out or exchanged, the disk, the disk table and the clamper may be damaged, or the film may be peeled off from the clamper and the disk table. In a certain case, a disk player will be itself erroneously operated.

SUMMARY OF THE INVENTION

An object of the present invention is to substantially eliminate defects or drawbacks encountered in the related art described above and to provide a clamp unit for a disk capable of preventing a disk and a disk table from slipping each other during the playing of the disk and easily removing the disk from the disk table when the clamping condition is released.

This and other objects can be achieved according to the present invention by providing a clamp unit for a disk comprising a disk table on which a disk is mounted, a clamper disposed in association with the disk table for clamping a disk under pressure therebetween and a film formed on a surface of either one of the disk table and the clamper, wherein the film is formed of a mixture of a synthetic resin and a plurality of particles embedded in the synthetic resin, both having viscous and elastic property, and some of the particles are exposed outside an outer surface of the film so as to provide an irregular surface having protruded portions.

In a preferred embodiment, the particles have diameters in a range of 10 to 50 $\mu$m. The particles are formed of urethane resin.

The synthetic resin has a film thickness larger than a maximum diameter of the particle. The film is formed through a spray-coating process, by coating a synthetic resin, or through an electro-deposition process.

According to the present invention of the characters and features described above, the film is formed of a material having a viscous and elastic property and having an irregular outer surface contacting the disk. Therefore, even in a case where the disk is played for a long time or a case where the disk is mounted or left on the disk table for a long time with the disk clamped condition, the film is not stuck to the disk and is easily peeled off from the disk table or the clamper.

Particularly, under a severe environmental condition such as high temperature or high moisture condition, the film can be easily removed from the disk table or the clamper, whereby when the disk is taken out or exchanged, the disk, the disk table and the clamper are not damaged and the film is not peeled off from the clamper and the disk table. Moreover, a disk player will not be erroneously operated.

The nature and further features of the present invention will be made more clear from the following descriptions made with reference to the accompanying drawings.

DESCRIPTION OF THE PREFERRED EMBODIMENT

Figure 1:
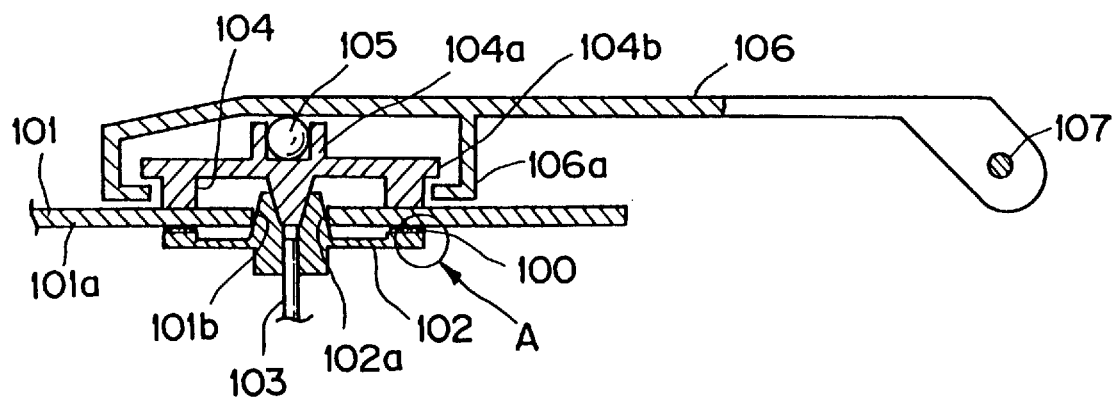
FIG. 1 is a sectional view of a clamp unit for a disk according to the present invention.

FIG. 1 is a sectional view of a clamp unit for a disk such as compact disk (CD), which generally comprises a disk table 102 on which a disk 101 is mounted and a clamper 104 for press-contacting the disk 101 to the disk table 102.

The disk 101 has one surface 101a on which information is recorded and a through hole 101b formed to a central portion thereof. The disk table 102 is formed of a metal or synthetic resin, or a material in combination thereof, and the disk table 102 has an outer diameter slightly smaller than an inner periphery of an information recording portion of the information recording surface 101a of the disk 101.

The disk table 102 is formed with a protruded portion 102a, frustum-conical in section having an upward tapered shape, which is fitted to the center hole 101b of the disk 101 to accurately position the same, and a recessed portion, frustum-conical in section having a tapered shape reverse to that of the protruded portion 102a, is formed to a central portion thereof. The disk table 102 is connected to a rotational shaft 103 of a motor M for rotating the disk table 102.

The clamper 104 is formed of a metal or synthetic resin, or a material in combination thereof. A ball 105 having a rigidity is disposed on a central portion of an upper surface of the clamper 104 to be rollable, and the clamper 104 also has a lower surface, as viewed, from which projection 104*a* having a frustum-conical shape adapted to be fitted to the recessed portion of the protruded portion 102*a* of the disk table 102. An outer peripheral portion of the clamper 104 is formed as a flanged portion 104*b*.

The clamper 104 is held by a clamper holder 106 having one end connected pivotally by means of a pin 107 and another one end to which is formed a hook 106*a* which is engageable with the flanged portion 104*b*. The clamper holder 106 is rotated by a mechanism such as disk player to thereby open or close the clamper 104.

A film or coating 100 is formed on an upper surface, as viewed, of the disk table 102, on which the disk 101 is mounted, by spraying, coating or electro-deposition coating a synthetic resin paint and then drying or baking the coat. The nature and function of the film 100 will be described in detail hereinafter.

In general, when the disk 101 is operated, the clamper holder 106 presses the clamper 104 through a ball 105 with a predetermined pressure or stress and the disk 101 is hence clamped in associated operation of the clamper 104 and the disk table 102. When the disk 101 is rotated and played, the presence of the film 100 prevents the disk 101 from slipping and, in addition, reduces mechanically vibration thereof.

When the operation of the disk 101 is ended or interrupted and the clamped condition is released, the hook 106*a* is engaged with the flanged portion 104*b* of the clamper 104 to thereby remove the clamper 104 from the disk 101.

As mentioned before, according to the present invention, the film or coating 100 is formed on the upper surface of the disk table 102, on which the disk 101 is mounted, by spraying, coating or electro-deposition coating a synthetic resin paint and then drying or baking the coat.

Figure 2:
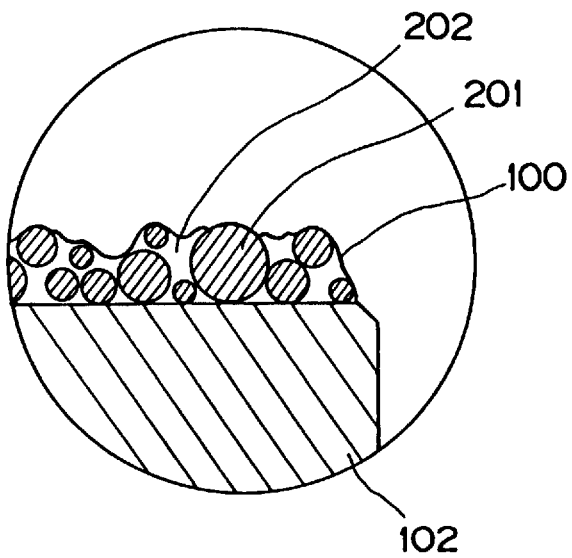
FIG. 2 is an enlarged sectional view of a portion encircled by A in FIG. 1.

FIG. 2 is an enlarged view showing a detailed condition of the film 100 in FIG. 1. Referring to FIG. 2, the film 100 is formed of a urethane resin having a viscous and elastic property, in which a plurality of fine particles 201 having diameters in a range of 10 to 50 μm are dispersed in a synthetic resin 202 also formed of urethane resin having a viscous and elastic property.

The film 100 is secured, to the surface of the disk table 102 on which the disk 101 is placed, by mixing a considerable amount of the fine particles 201 with the synthetic resin 202, agitating the mixture to provide a uniform structure, spray-coating the mixture on the surface of the disk table 102 and then drying the same. Although the thickness of the film of the synthetic resin 202 is selected from a range of about 20 to 60 μm, in actual, it is decided by the diameter of the particle 201. For example, in the case of about 10 μm of the particle diameter, it is desired for the synthetic resin to have a thickness of about 20 μm. The thickness of the film of the synthetic resin 202 is determined to such extent that, when the disk clamp unit performs a usual opening or closing operation, the fine particles 201 do not adhere to the disk 101 due to its viscosity. That is, in this meaning, the synthetic resin 202 serves as a binder for holding the particles 201. It is not necessary to make uniform the diameters of the respective particles 201, and in such case, the thickness of the synthetic resin 202 is determined by the particle having the maximum diameter.

As is understood from the above disclosure, the particles 201 formed in the lower portion of the synthetic resin film 202 are embedded therein, but the particles 201 disposed on the surface side of the synthetic resin film 202 are partially exposed outside, which form an irregular outer surface of the synthetic resin film 202. The irregular surface includes a plurality of protruded portions which attain advantageous effect at the clamping time of the disk 101.

That is, when the disk 101 is placed on the disk surface abuts against or contacts some of protruded (exposed) portions of the particles forming the irregular outer surface of the film 100. The protruded portions abutting against the disk 101 depressed by the self-gravity of the disk 101 to thereby form a plurality of spots each having a depressed flat surfaces substantially parallel to the disk surface and each having a depressed small area.

Then, when the clamper 104 is operated to clamp the disk 101, these protruded portions are further depressed and deformed and the depressed upper surfaces increase in their spot surface areas, thereby forming an abutting surface area.

Figure 3:
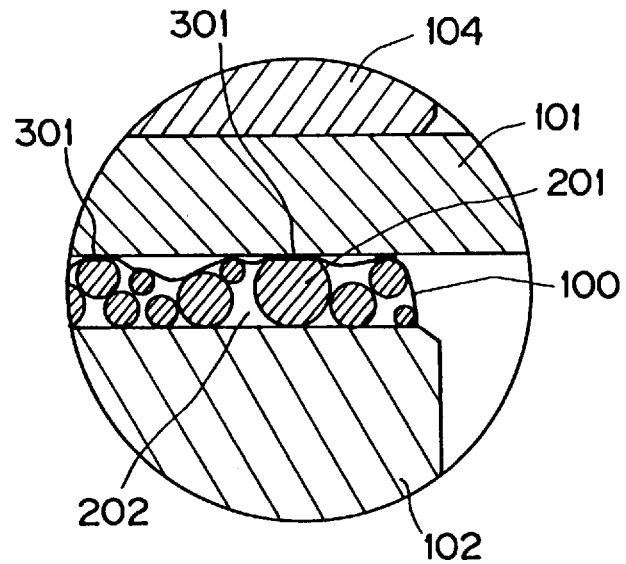
FIG. 3 is a sectional view showing a clamping condition in which a film is press-contacted to a disk.

FIG. 3 shows a condition of the disk clamped condition in which the disk 101 is depressed against the film 100 in the manner mentioned above, in which the depressed spot surfaces are denoted by reference numeral 301, which abut against the disk surface.

As mentioned above, since a plurality of the depressed abutting surfaces exist partially over the outer surface of the film 100, the total area of the abutting surfaces are small in comparison with the entire outer surface of the film 100.

Figure 4:
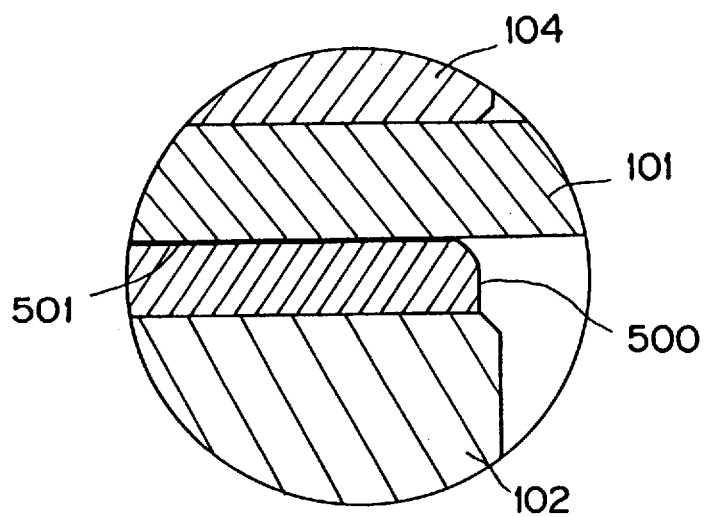
FIG. 4 is an enlarged sectional view of a portion corresponding to FIG. 2, according to a comparison example.

In order to examine the advantageous effect of the film 100 of the present embodiment, a comparison example as shown in FIG. 4, which is based on the aforementioned related art, is studied here.

In FIG. 4, the comparison example is provided with a film 500 in place of the film 100 of the present embodiment, which is applied to a disk table 102 and contacts a disk 101 over its entire outer surface 501 when the disk 101 is clamped by a clamper 104. The film 500 is generally made of a soft synthetic resin material having relatively uniform structure and flat outer surface and having a viscous and elastic property. Thus, according to the comparison example shown in FIG. 4, in a case where the disk 101 is played for a long time or a case where disk 101 is mounted or left on the disk table 102 for a long time with a disk clamped condition, the film 500 is stuck to the disk 101 by the self-gravity of the disk 101 or pressing force of the clamper 104 and, in an adverse case, the disk 101 cannot be peeled off from the disk table 102 because the film 500 is substantially entirely contacted to the disk surface 501. The increased contact area increases of the viscosity of the film 500, thus providing problems as mentioned hereinbefore.

On the other hand, according to the present invention, the film 100 having viscous and elastic property is formed with a plurality of protruded portions only which abut against the disk surface when clamped. Thus, the total area of the film 100 contacting the disk surface is extremely smaller than that of the film 500 of the comparison example. Furthermore, the film 100 is formed of a resin material having the viscous and elastic property, so that when the clamped condition is released, the protruded portions which have been depressed and increased in their contacting areas easily return to their original states before the clamping.

The following table 1 shows results of experiments performed under various environmental conditions by utilizing the film 500 of the comparison example and the film 100 of the present invention. In the experiment, the sticking conditions and the peeling-off conditions of the films 100 and 500 to and from the disk 101 after the disk 101 has been clamped for a predetermined times under the various environmental conditions and released. In the experiments, the film 500 is formed of a Sun-coat (trade mark) GR#305RF (manufactured by SANESU Lubrication K.K.) and the film 100 is formed of a Defric-coat (trade mark) FCS-5 (manufactured by K. K. KAWAMURA KENKYU-SHO).

TABLE 1

|  | High Temperature | High Moisture | Thermal |
|---|---|---|---|
| Film 100 | ○ | ○ | ○ |
| Film 500 | X | X | Δ |

○: No-Stuck State
X: Stuck State
Δ: Partially Stuck State

The experiments were performed under the following conditions.
High Temperature: 85° C.
High Moisture: 60° C., 90%RH
Thermal: Circulated at −30° C. and 80° C. by 0.5 Hour, respectively
Experiment Time: 96 Hours for Each Case As can be seen from the above table 1, the film 100 according to the present invention is not stuck under any condition of the high temperature, the high moisture and the thermal conditions, which is apparently effective in comparison with the case of the film 500 of the comparison example which is based on the aforementioned related art.

In the foregoings, the disk clamp unit in which the disk is placed on the horizontally arranged disk table, but the present invention is applicable to a disk clamp unit in which the disk is clamped vertically.

It is to be noted that a modification in which the film 100 is formed on the surface of the clamper which abuts against the disk surface is also within a scope of the present invention.

The film 100 is formed by spraying the synthetic resin on the surface of the disk table which abuts against the disk surface. However, the film may be formed by coating a synthetic resin paint or through an electro-deposition process, or it may be formed by dipping the disk table into a liquid state synthetic resin paint.

Furthermore, an urethane resin paint is used as the synthetic resin coat forming the film 100, but other soft material having viscous and elastic property may be also utilized, such as a material mixed with volatile solvent or a material having a thermosetting property.

The urethane resin is described as fine particles contained in the film, but any other material having a viscous and elastic property may be utilized. The fine particle may have a hollow structure and have a various outer shapes other than a spherical shape. That is, it is important for the material of the film 100 to form an irregular outer surface which contacts the disk 101.

As described above, according to the present invention, the film is formed of material having a viscous and elastic property and having an irregular outer surface contacting the disk.

Therefore, even in a case where the disk is played for a long time or a case where the disk is mounted or left on the disk table for a long time with the disk clamped condition, the film is not stuck to the disk and easily peeled off from the disk table or the clamper.

Particularly, under a severe environmental condition such as high temperature or high moisture condition, the film can be easily removed from the disk table or the clamper, whereby when the disk is taken out or exchanged, the disk, the disk table and the clamper are not damaged and the film is not peeled off from the clamper and the disk table. Moreover, a disk player will not be erroneously operated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A clamp unit for a disk comprising:

a disk table on which said disk is mounted;

a clamper disposed in association with said disk table for clamping said disk under pressure therebetween; and a film formed on a surface, contacting the disk, of either one of said disk table and said clamper, wherein said film is formed of a mixture of a synthetic resin and a plurality of particles disposed in the synthetic resin, both having viscous and elastic properties and some of said particles are exposed outside an outer surface of the film so as to provide an irregular surface having protruded portions.

2. A clamp unit for a disk according to claim 1, wherein said particles have diameters in a range of 10 to 50 μm.

3. A clamp unit for a disk according to claim 1, wherein said particles are formed of urethane resin.

4. A clamp unit for a disk according to claim 1, wherein said synthetic resin has a film thickness larger than a maximum diameter of said plurality of particles.

5. A clamper unit for a disk according to claim 1, wherein said film is formed through a spray-coating process.

6. A clamper unit for a disk according to claim 1, wherein said film is coated onto said surface.

7. A clamper unit for a disk according to claim 1, wherein said film is formed through an electro-deposition process.

8. A clamper unit for a disk according to claim 1, wherein each of said particles has a spherical outer shape.

\* \* \* \* \*